(12) United States Patent
Dondurur et al.

(10) Patent No.: US 9,338,411 B2
(45) Date of Patent: May 10, 2016

(54) SYSTEM AND METHOD FOR REMOTE UTILITY METER READING

(71) Applicant: KING FAHD UNIVERSITY OF PETROLEUM AND MINERALS, Dhahran (SA)

(72) Inventors: Mehmet Dondurur, Crofton, MD (US); Ahmet Z. Sahin, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 417 days.

(21) Appl. No.: 13/712,825

(22) Filed: Dec. 12, 2012

(65) Prior Publication Data

US 2014/0160297 A1    Jun. 12, 2014

(51) Int. Cl.
*H04N 7/18* (2006.01)
*H04L 12/28* (2006.01)

(52) U.S. Cl.
CPC ............ *H04N 7/183* (2013.01); *H04L 12/2823* (2013.01)

(58) Field of Classification Search
None
See application file for complete search history.

(56) References Cited

U.S. PATENT DOCUMENTS

| | | | |
|---|---|---|---|
| 4,680,704 A * | 7/1987 | Konicek et al. | 382/100 |
| 5,870,140 A | 2/1999 | Gillberry | |
| 7,400,350 B2 * | 7/2008 | Butterworth | 348/239 |
| 8,144,027 B2 * | 3/2012 | Goldberg et al. | 340/870.02 |
| 8,242,932 B2 * | 8/2012 | Roslak et al. | 340/870.02 |
| 2001/0024165 A1 | 9/2001 | Steen, III et al. | |
| 2006/0209857 A1 * | 9/2006 | Hicks, III | 370/401 |
| 2007/0008171 A1 * | 1/2007 | Bowman | 340/870.02 |
| 2007/0055640 A1 | 3/2007 | Dababneh et al. | |
| 2007/0103324 A1 | 5/2007 | Kosuge et al. | |
| 2007/0130408 A1 | 6/2007 | Leach | |
| 2008/0150752 A1 | 6/2008 | Klaus et al. | |
| 2008/0180275 A1 | 7/2008 | Whitaker et al. | |
| 2008/0272933 A1 | 11/2008 | Cahill-O'Brien et al. | |
| 2009/0146838 A1 | 6/2009 | Katz | |
| 2010/0315263 A1 | 12/2010 | Shuey | |
| 2011/0202196 A1 | 8/2011 | Venkatakrishnan et al. | |
| 2013/0050498 A1 * | 2/2013 | Kennedy et al. | 348/160 |
| 2013/0070099 A1 * | 3/2013 | Gellaboina et al. | 348/160 |
| 2014/0139682 A1 * | 5/2014 | Lye et al. | 348/160 |

FOREIGN PATENT DOCUMENTS

| | | |
|---|---|---|
| EP | 2 482 047 A1 | 8/2012 |
| GB | 2 399 707 A | 9/2004 |
| JP | 2006-99651 | 4/2006 |
| WO | WO 2009/049425 A1 | 9/2009 |
| WO | WO 2012/004597 A2 | 1/2012 |

* cited by examiner

*Primary Examiner* — Heather Jones
(74) *Attorney, Agent, or Firm* — Richard C. Litman

(57) ABSTRACT

The system and method for remote utility meter reading are include a camera positioned adjacent the face of a utility meter for generating an analog optical image signal representative of a the utility meter having a visual identifier associated with the utility meter. The visual identifier may be a label, a bar code or the like for identifying the location of the particular utility meter. An analog-to-digital converter is in communication with the camera for receiving the analog optical image signal and generating an associated digital image signal. The original analog optical image signal is preserved, so that a transmitter in communication with the camera may transmit both the analog optical image signal and the digital image signal to a remote host associated with the utility company for remote reading of the utility meter.

19 Claims, 2 Drawing Sheets

SYSTEM AND METHOD FOR REMOTE UTILITY METER READING

BACKGROUND OF THE INVENTION

1. Field of the Invention

The present invention relates to utility meters, such as gas, water and electric meters, and particularly to a system and method for remote utility meter reading.

2. Description of the Related Art

Utility meters, including gas, electric, and water meters, require periodic metering at the location of the meter. Visual inspection by authorized personnel is used, as opposed to automatic systems, in order to prevent tampering. Given the exponential growth rate of homes and other buildings that use public utilities, the ability to manually monitor each and every meter has become burdensome. It would be desirable to provide a remote monitoring system that still utilizes visual inspection, but which does not require a physical presence at each meter.

In addition to the time and effort required to personally monitor each meter at its location, meter readers must travel to each meter, typically following pre-planned routes. This prevents a utility company from being able to monitor a specific meter on demand. Even if a meter reader is rerouted to a particular location, the meter reader must still spend time traveling to the location, and the meter cannot be read instantly. Thus, a system and method for remote utility meter reading solving the aforementioned problems is desired.

SUMMARY OF THE INVENTION

The system for remote utility meter reading includes a camera positioned adjacent the face of a utility meter for generating an analog optical image signal representative of the utility meter and a visual identifier associated with the utility meter. The visual identifier may be a label, a bar code or the like for identifying the location of the particular utility meter. An analog-to-digital converter is in communication with the camera for receiving the analog optical image signal and generating an associated digital image signal. The original analog optical image signal is preserved, so that a transmitter in communication with the camera may transmit both the analog optical image signal and the digital image signal to a remote host associated with the utility company for remote reading of the utility meter.

Additionally, the system may include a local display monitor in the home or building associated with the utility meter for locally displaying an image representing utility usage. The camera may be powered by the local utility power supply and may further include a rechargeable battery power supply, as well as an auxiliary power supply, such as one or more solar panels, one or more wind turbines, or the like.

Preferably, the camera also includes local non-transitory storage memory for locally recording the analog optical image signal and the digital image signal. As a further alternative, the camera may be mounted on a movable mount, allowing the camera to be translated for generating optical signals associated with a selected one of a plurality of utility meters in a bank of meters.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
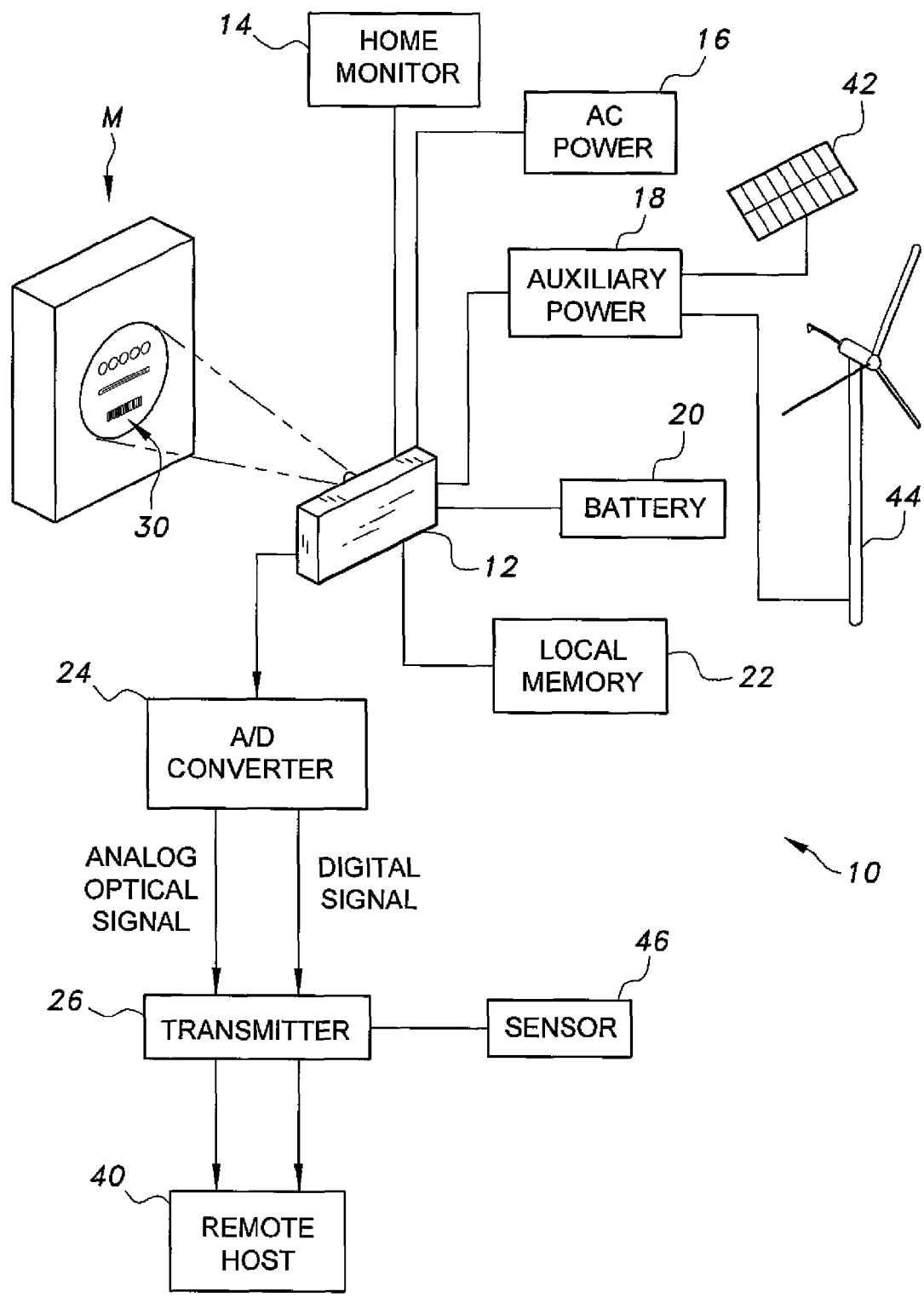
FIG. 1 is a block diagram showing a system for remote utility meter reading according to the present invention.

As shown in FIG. 1, the system 10 for remote utility meter reading includes a camera 12 positioned adjacent the face of an exemplary utility meter M for generating an analog optical image signal representative of the utility meter M having a visual identifier 30 associated with the utility meter M. It should be understood that the meter M is shown for exemplary purposes only, and that the utility meter M may be any type of meter that is typically visually inspected, such as an electrical meter, water meter, gas meter or the like. The visual identifier 30 may be a label with the utility meter address printed on it, a bar code, or other identifier for identifying the location of the particular utility meter M. Further, it should be understood that the camera 12 may be any suitable type of camera, such as a video camera, a digital camera, a "web cam" style camera, a camera associated with a smart phone or other portable or mobile device, or the like.

An analog-to-digital converter 24 is in communication with the camera 12 for receiving the analog optical image signal and generating an associated digital image signal. The original analog optical image signal is preserved, so that a transmitter 26 in communication with the camera 12 may transmit both the analog optical image signal and the digital image signal to a remote host 40 associated with the utility company for remote reading of the utility meter M. The transmitter 26 may be any suitable type of transmitter, and may transmit the signals to the remote host 40 via a direct hard line or wirelessly, either through the Internet or any other suitable type of wide area network, through a local area network, or by telephone line modem or a cellular telephone network, for example.

The camera 12 may record the meter M continuously and in real time for continuous live monitoring by the remote host 40, or may record the meter M periodically on a set or predetermined schedule. Alternatively, the transmitter 26 may be replaced by a transceiver for receiving commands from the remote host 40 to capture an image of meter M on demand. The camera 12 may be placed in front of the face of meter M, mounted within the interior of a typically closed meter box, or the like.

The digital signal is preferably in a compressed digital format for ease of transmission time. The purpose of transmitting both the analog and digital signals is for verification of the accuracy of the transmitted data. Verification of the transmitted information will prevent errors in billing, power theft or appropriation, improper energy usage, errors in measured energy usage or the like. In addition to meter-related information, such as an identification number, barcode information, physical address data, etc., the latitude and longitude of the remote meter location may also be transmitted as an additional verification attribute. Preferably, each meter is labeled with a property address, barcode and meter code/number, all to be included in the image signal. A standardized, permanent identification label, including the bar code, meter code and address, may be attached to the interior of the meter housing for identifying each meter and linking the meter to a particular property address. The transmitted data will then include the meter code and address, along with the image signal. As an alternative, the raw analog image data may be sent directly to the remote host 40 without the additional digital signal and without the additional conversion by the A/D converter 24.

Additionally, the system 10 may include a local display monitor 14 in the home or building associated with the utility meter M for locally displaying an image representing utility usage. The camera 12 may be powered by the local utility power supply, such as a typical AC power supply 16, and may further include a rechargeable battery power supply 20, as well as an auxiliary power supply 18, such as one or more solar panels 42, one or more wind turbines 44, and combinations thereof or the like. Preferably, the camera also includes local non-transitory storage memory 22 for locally recording the analog optical image signal and the digital image signal. The local memory 22 allows for backup readings when the transmitter 26 or transmitter network are out of service.

Further, an additional sensor 46 may be in communication with the transmitter 26 for transmitting an alert signal to the remote host 40 when utility consumption has ceased. The sensor 46 may be a vibration sensor mounted directly to the meter M or the like. In the example of a vibration sensor, when no vibration is detected for a pre-set period of time, an alert signal may be generated and transmitted to the remote host 40 and/or the local utility user associated with meter M. The alert signal may be prevented in advance for known periods when the utility is not expected to be used.

Figure 2:
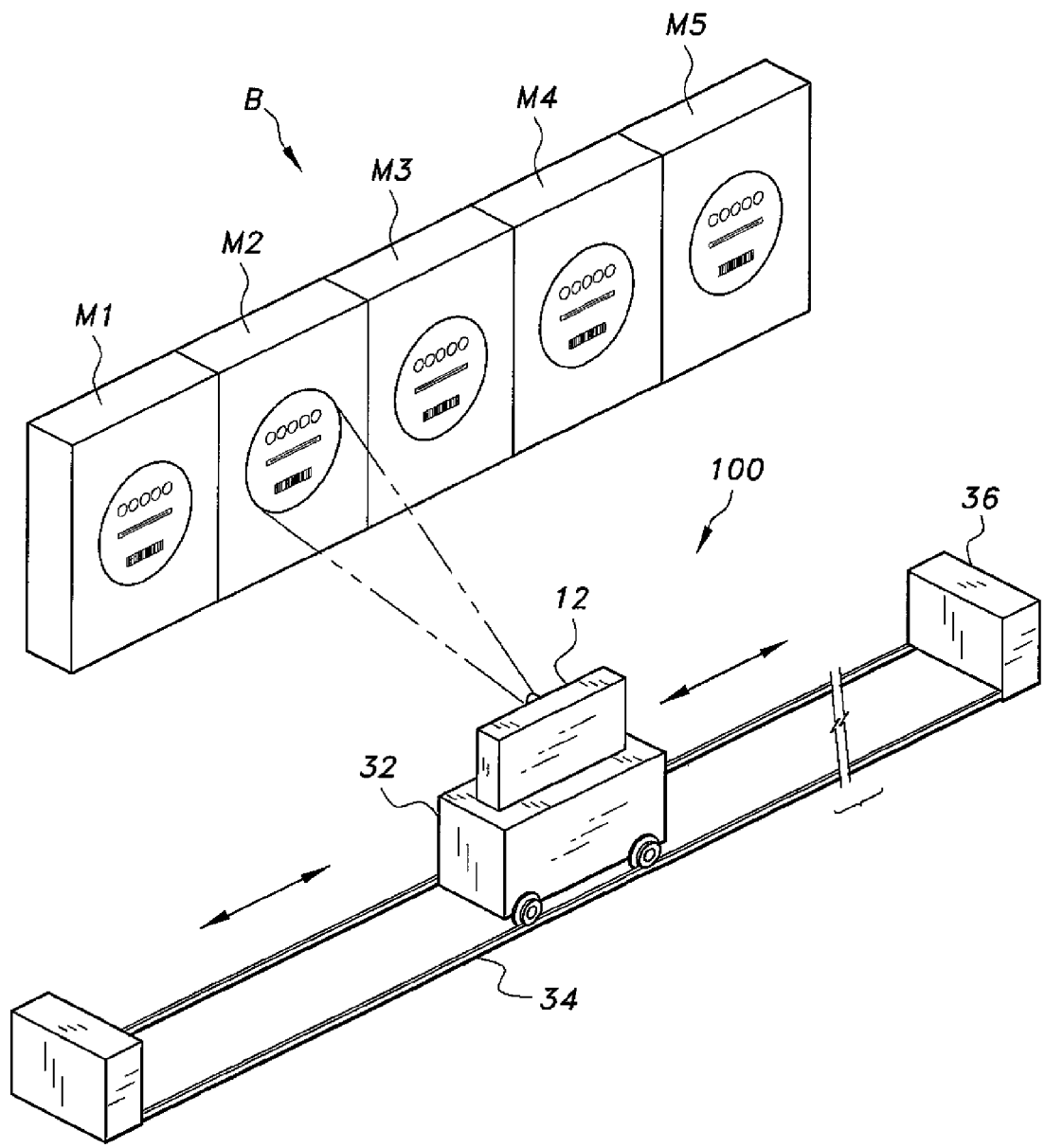
FIG. 2 is a diagrammatic perspective view showing an alternative embodiment of a system for remote utility meter reading according to the present invention.

As a further alternative, as shown in the system 100 of FIG. 2, the camera 12 may be mounted on a movable mount 32, allowing the camera 12 to be translated for generating optical signals associated with a selected one of a plurality of utility meters M1-M5 in a bank B of meters. As shown, the mount 32 may be slidably mounted to a track 34 or the like, and driven by a motor 36 and associated belt or pulley. It should be understood that the mount 32 may be driven and/or translated by any suitable type of drive system. For clarity and illustrative purposes, the additional elements of the system, such as the home monitor, auxiliary power, the A/D converter, etc., as described above with reference to FIG. 1, have not been shown in FIG. 2, although it should be understood that camera 12 in system 100 may be in communication with any of these elements, as described above.

It is to be understood that the present invention is not limited to the embodiments described above, but encompasses any and all embodiments within the scope of the following claims.

We claim:

1. A system for remote utility meter reading, comprising:
a camera for generating an analog optical image signal representative of a utility meter having a visual identifier associated with the utility meter;
an analog-to-digital converter in communication with the camera for receiving the analog optical image signal and generating an associated digital image signal;
a transmitter connected to the camera for transmitting both the analog optical image signal and the digital image signal to a remote host, wherein both the analog optical image signal and the digital image signal are used for verification of location and power consumption associated with the utility meter;
a track positioned adjacent the utility meter;
a camera mount slidably mounted on the track, wherein said camera is mounted on said camera mount; and
means for mechanically translating said camera and said camera mount with respect to said track for generating the analog optical image signal representative of a selected one of a plurality of utility meters.

2. The system for remote utility meter reading as recited in claim 1, further comprising a local monitor display in communication with said camera for locally displaying an image representing utility usage.

3. The system for remote utility meter reading as recited in claim 1, wherein the camera is powered by a local utility power supply.

4. The system for remote utility meter reading as recited in claim 3, further comprising at least one battery in electrical communication with said camera.

5. The system for remote utility meter reading as recited in claim 4, further comprising at least one auxiliary power supply in electrical communication with said camera and the at least one battery.

6. The system for remote utility meter reading as recited in claim 5, wherein the at least one auxiliary power supply comprises at least one solar panel.

7. The system for remote utility meter reading as recited in claim 5, wherein the at least one auxiliary power supply comprises at least one wind turbine.

8. The system for remote utility meter reading as recited in claim 1, further comprising local non-transitory storage memory for locally recording the analog optical image signal and the digital image signal.

9. A method of remote utility meter reading, comprising the steps of:
generating an analog optical image signal with a camera, the analog image signal being representative of a utility meter having a visual identifier associated with the utility meter;
converting the analog optical image signal into an associated digital image signal;
transmitting both the analog optical image signal and the digital image signal to a remote host, wherein both the analog optical image signal and the digital image signal are used for verification of location and power consumption associated with the utility meter;
a track positioned adjacent the utility meter;
a camera mount slidably mounted on the track, wherein said camera is mounted on said camera mount; and
mechanically translating said camera and said camera mount with respect to said track for generating the analog optical image signal representative of a selected one of a plurality of utility meters.

10. The method of remote utility meter reading as recited in claim 9, further comprising the step of locally displaying an image representing utility usage.

11. The method of remote utility reading as recited in claim 10, wherein the step of generating the analog optical image signal comprises generating the analog optical signal representative of the selected one of the plurality of utility meters.

12. The method of remote utility reading as recited in claim 10, wherein the step of generating the analog optical image signal comprises continuously generating the analog optical signal in real time.

13. The method of remote utility reading as recited in claim 10, wherein the step of generating the analog optical image signal comprises periodically generating the analog optical signal.

14. The method of remote utility reading as recited in claim 10, further comprising the step of transmitting an alert signal to the remote host upon detection of a cessation of utility usage.

15. A system for remote utility meter reading, comprising:
a camera for generating an analog optical image signal;
a track;

a camera mount slidably mounted on the track, wherein said camera is mounted on said camera mount;

means for mechanically translating the camera and the camera mount with respect to the track, the camera generating the analog optical image signal representative of a selected one of a plurality of utility meters having a visual identifier associated therewith;

an analog-to-digital converter in communication with the camera for receiving the analog optical image signal and generating an associated digital image signal;

a transmitter connected to the camera for transmitting both the analog optical image signal and the digital image signal to a remote host, wherein both the analog optical image signal and the digital image signal are used for verification of location and power consumption associated with the utility meter.

16. The system for remote utility meter reading as recited in claim 15, further comprising a local monitor display in communication with said camera for locally displaying an image representing utility usage.

17. The system for remote utility meter reading as recited in claim 15, wherein the camera is powered by a local utility power supply.

18. The system for remote utility meter reading as recited in claim 17, further comprising at least one auxiliary power supply in electrical communication with said camera.

19. The system for remote utility meter reading as recited in claim 15, further comprising local non-transitory storage memory for locally recording the analog optical image signal and the digital image signal.

\* \* \* \* \*